July 4, 1939.   G. F. BAHR   2,164,692
BRAKE LEVER EXTENSION
Filed July 26, 1937
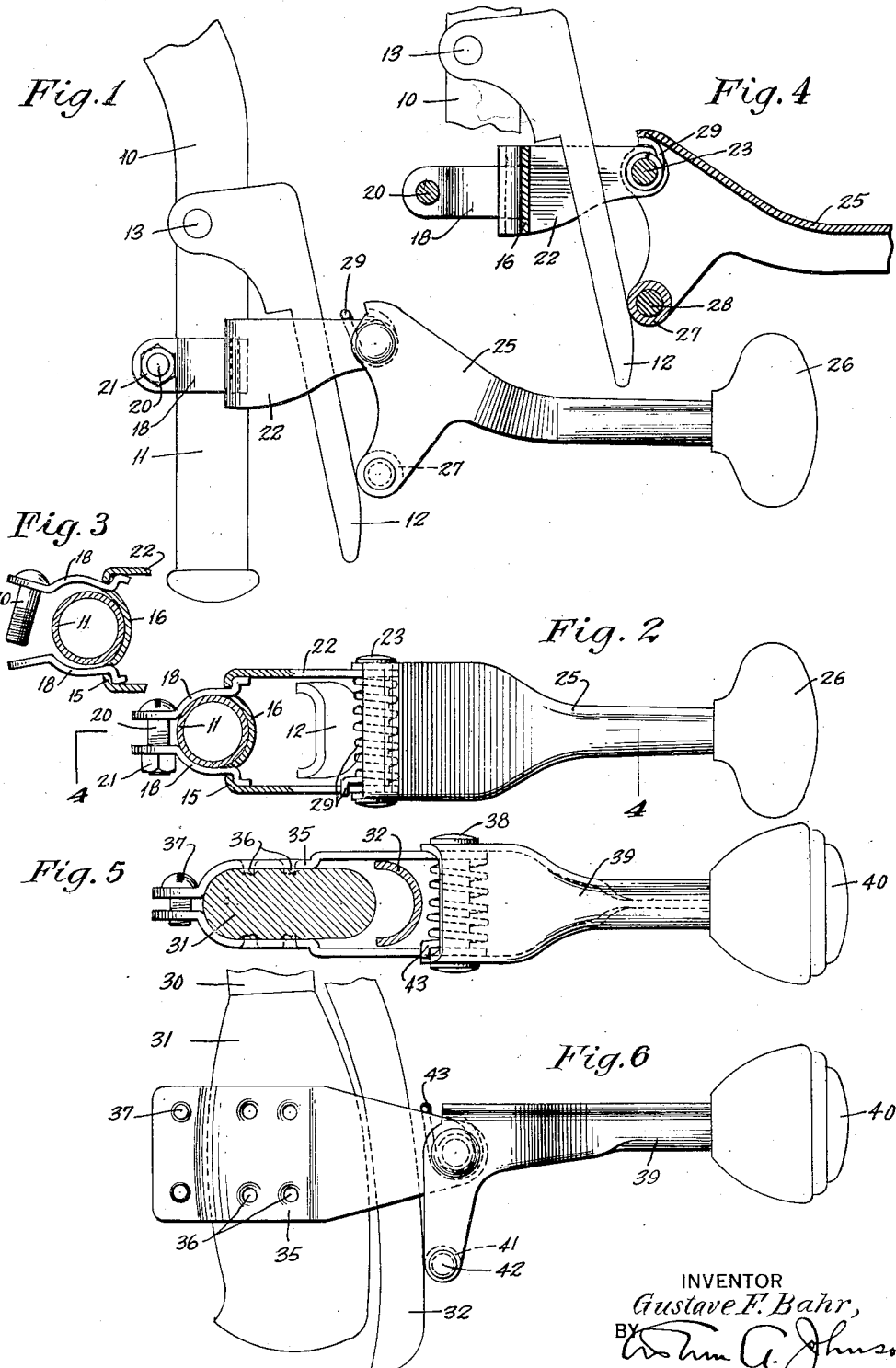
INVENTOR
Gustave F. Bahr,
BY
ATTORNEY Patented July 4, 1939

2,164,692

UNITED STATES PATENT OFFICE 2,164,692

BRAKE LEVER EXTENSION

Gustave F. Bahr, Fairfield, Conn., assignor to Casco Products Corporation, Bridgeport, Conn., a corporation of Connecticut Application July 26, 1937, Serial No. 155,674

11 Claims. (Cl. 74—479)

This invention relates to extension handles and more particularly extension handles or levers for brake levers of motor vehicles.

Brake levers with their associated brake-release grips are now mounted in motor vehicles either extending upwardly from a pivotal mounting usually in the floor of the automobile or downwardly from a pivotal mounting usually behind the dashboard of an automobile. The levers so mounted are in most cases quite inaccessible to the operator of the automobile. It is, therefore, advantageous to provide an extension lever or handle which will be of sufficient length to extend from the brake lever to a position where the operator can readily apply the brake or release the same.

In mounting these extension levers on the brake levers, they are positioned on the lever by a hanger which carries a pivot for the extension lever about which the extension lever moves. The extension lever has a brake-release grip contacting element which will contact and move the usual brake-release grip on the brake lever to remove the latch holding the brake lever in its desired position.

Difficulty has been encountered in adequately clamping the extension levers on the brake levers so that they will operate efficiently without slipping or shifting position due to the pressure applied to the extension lever to release the brakes or apply the same. When operating the brake-release grip, pressure is applied to the extension lever in a direction toward the end of the brake lever. If the extension lever can slip, it will move in the direction in which the pressure is applied. This will move it out of cooperative relation with the brake-release grip and make it inoperative. It is, therefore, imperative that an adequate clamp be used to hold the extension lever in place. Accordingly, the present invention provides a clamping means which, with little effort in the application of the same, will securely mount the extension lever on the brake lever in operative relation to the brake-release grip so that the same may be operated without danger of it slipping relatively to the brake lever when actuated to operate the brake.

In the preferred form of the present invention, the hanger for mounting the extension lever on the brake lever is shaped to engage the front of the brake lever or that part facing the brake-release grip and has been provided with a pair of pivotally mounted elements secured to the hanger and extending around the brake lever so as to engage the back of the same. These extensions are provided with draft means which will move them into clamping relation with the lever and draw the hanger into a tight grip with the brake lever. This arrangement effectively holds the lever extension in operative position on the brake lever.

When it is desired to use the extension lever with a brake lever having a pistol-grip type of handle, difficulty has been encountered in adequately supporting the extension lever due to the fact that only a small space is present between the brake-release grip and the lever so that the hanger cannot be extended between the same. Accordingly another form of the invention is provided which will adequately grip the handle so as to secure extension levers to pistol-grip type of handles.

In this form of the invention the hanger for supporting the extension lever is provided with sections which contact the sides of the handle. The contacting faces of these sections are provided with a roughened surface or with sharp projections which when moved into clamping relation with the handle bite into the material of the handle, which is usually hard rubber, and effectively anchor the lever extension against shifting or other displacement along the brake lever.

Other features and advantages of the invention will be apparent from the specification taken in connection with the drawing, in which:

Figure 1 shows a side elevation of one form of the invention as applied to a brake lever having a round handle.

Fig. 2 is a plan view partly in section of Fig. 1.

Fig. 3 is a detailed view showing the clamp in operative relation but loose on the handle.

Fig. 4 is a section of the extension lever taken along line 4—4 of Fig. 2.

Fig. 5 is a plan view similar to that of Fig. 2 showing a modified form of the hanger.

Fig. 6 is a side elevation showing the modified form of hanger applied to a pistol-grip handle.

The invention, as shown in the drawing, is applied to a downwardly-extending or inverted brake lever. It is obvious that it may be used with upwardly-extending brake levers as well. A brake lever 10 has a handle 11 and a brake-release grip 12 pivoted thereto as at 13. The mechanism for releasing the latch controlled by the brake-release grip 12 is not shown but may be of any usual construction.

The extension of the present invention is shown as comprising an extension lever 25 mounted on the brake lever in cooperative relation with the brake-release grip by means of a U-shaped hanger of sheet metal.

The handle-engaging face or bow of the U 15 is provided with a depression 16 for engaging the front face of the brake lever, or, in other words, the face of the brake lever opposite the brake-release grip. As shown in Fig. 2, the hanger is positioned on a cylindrical handle although the handle may be of any desired shape. The depression may be made to the same dimensions of the handle to hold the same thereon. In the preferred form, however, the depression 16 has a larger radius than that of the handle so that it does not contact the handle at the edges of the depression, as shown in Fig. 3. Adjacent the edges of the depression are a pair of slots positioned to extend parallel to the axis of the handle.

It is desired that the hanger be securely locked and positioned on the handle so that the extension lever can actuate the brake-release grip. Accordingly the hanger is locked to the brake lever by a pair of clamping elements 18. These elements are shaped, as shown in Fig. 2, so as to contact the back surface of the handle. The forward ends of the elements are provided with a reverse bend. The clamping elements are adapted to be inserted through the slots in the hanger member with the reverse bend engaging the inner surface of the hanger member, as shown in Fig. 2, and when so arranged the clamping elements have a pivotal movement on the hanger.

The clamping elements may be moved into clamping engagement by any desired means. In this preferred form of the invention, the rear ends of the clamping members are provided with holes through which a bolt 20 is inserted. A nut 21 is threaded on the bolt to move the clamping elements into the clamping relation.

As previously noted the depression 16 has a radius larger than that of the handle. When the clamping elements are tightened up they tend to pull the edges of the depression into contact with the handle so that the handle will be engaged over the entire surface of the depression. This forms a very secure clamp which will withstand a large amount of pressure.

The legs 22 of the U-shaped bracket extend forwardly of the brake handle and have holes therein for the reception of a pivot pin 23.

The extension lever 25, noted above, is formed of sheet metal by stamping with suitable dies so as to be channel-shaped in cross-section for at least a portion of its length. The lever is substantially Y-shaped in side elevation and, in plan, the end adjacent the pivot pin is broad and slopes into a narrow portion to which is fixed a knob or manually engageable element 26 in the usual manner.

The upper arm of the Y, as shown in Fig. 1, is provided with a pair of holes whereby the extension lever is pivoted on the pivot pin 23.

After the extension lever has been assembled on the pivot pin 23, the latter is headed over or otherwise secured so as to hold the hanger and extension lever together. The lower arm of the Y has positioned therein between the sides of the lever a fiber roller 27 mounted on a supporting pin 28.

Movement of the extension lever downwardly, in Fig. 1, about the pivot 23 will cause the fiber roller to engage the brake-release grip to move the same inwardly toward the handle and release the latch holding the handle in its definite position.

A spring 29 is positioned around the pivot pin and has one end engaging the hanger member and has the other end positioned against the under surface of the extension lever as shown in Fig. 4 and maintains the extension lever in firm engagement with the brake-release grip so that the jarring of an automobile will not cause these elements to rattle. This spring is strong enough to hold these elements firmly engaged but is not strong enough to move the brake-release grip to release the latch.

When it is desired to mount an extension lever and its associated hanger on the brake lever, the clamping elements are inserted through the slots in the hanger member so as to rock therein. The hanger member is positioned on the brake lever with the depression formed in the lever-engaging face in contact with the front face of the lever and the brake-release grip extending between the two legs of the U and in contact with the fiber roller on the extension lever. The bolt is inserted through the holes in the clamping elements and the clamping elements are drawn together causing the hanger to be securely locked in position as previously described.

In the form of the invention shown in Fig. 5, an extension lever is mounted on a brake lever 30 having a pistol-grip handle 31 and a brake-release grip 32 in cooperative association therewith. As shown in Fig. 5, the brake-release grip is positioned closely adjacent the edge of the pistol-grip handle and is curved so as to move into a nested relation with the edge when the brake-release grip is moved into the brake-release position. This makes it difficult to mount a hanger for the extension lever on the handle since the same cannot pass around or engage the front face of the handle. According to the form of the invention shown in Figs. 5 and 6, the extension lever is mounted on a hanger comprising a pair of lever-engaging plates 35 of relatively stiff metal. As shown in Fig. 5 the lever-engaging plates are adapted to be positioned against the sides of the pistol-grip handle and are provided with roughened projections 36 to engage the handle. The roughened projections may take the form of knurling or other roughening, but in the preferred form of the invention, shown therein, they are formed by extrusion of the metal by means of a punch. The back ends of the plates are formed to engage the back of the handle and have projecting elements provided with holes to receive a pair of round head screws 37 which will draw the plates into engagement with the sides of the handle.

When the plates are drawn into handle-engaging position by the screws 37 the roughened surfaces on the engaging faces of the plates bite into the material of the handle, which is hard rubber or some similar material, and effectively prevent any movement of the hanger on the handle when pressure is applied to actuate the brake. The forward ends of the plate 35 are bent outwardly so as to clear the brake-release grip and have holes at the ends thereof for the reception of a pivot pin 38 for pivotally mounting the extension lever 39.

The extension lever in this form of the invention is stamped from sheet metal as before and is a substantially L-shaped member in side elevation, and, in plan, is broad at the portion engaging the pivot and slopes off into a rounded portion of reduced diameter upon which is mounted a knob 40. The base of the L is provided at one end with holes for engaging the pivot pin 38 and at the other end with a fiber roller 41 mounted on a pin 42 secured to the extension lever and positioned to engage the brake-release grip.

When the knob 40 is moved in a downward direction, as shown in Fig. 5, the roller 41 moves the brake-release grip to release the latch.

A spring 43 is positioned around the pin 38 so as to engage the hanger and the extension lever and hold the latter in firm contact with the brake-release grip so that jarring of the automobile will not cause these elements to rattle.

Variations and modifications may be made within the scope of this invention and portions of the improvements may be used without others.

I claim:

1. An extension for vehicle brake levers having a handle and a brake-release grip thereon comprising an extension lever; a hanger for pivotally mounting the extension lever on the brake lever forwardly of and in cooperative relation with the brake-release grip, said hanger including a brake lever engaging section having rearwardly-extending wing members; draft means mounted in the rearwardly-extending wing members for clamping the hanger on the brake lever; and resilient means surrounding the pivotal mounting and engaging the hanger and the extension lever to hold the latter in firm engagement with the brake-release grip.

2. An extension for brake levers having a handle and a brake-release grip thereon comprising an extension lever; a hanger for pivotally mounting the extension lever on the brake lever forwardly of and in cooperative relation with the brake-release grip, said hanger including a brake lever engaging section having a pair of rearwardly-extending wing members whereby the section may be clamped to the brake lever; forwardly-extending members carried by the hanger for supporting a pivotal mounting for the extension lever; means for clamping the hanger on the brake lever; and resilient means surrounding the pivotal mounting and engaging the hanger and the extension lever to hold the latter in firm engagement with the brake-release grip.

3. An extension for vehicle brake levers having a handle and a brake-release grip thereon comprising an extension lever; a hanger for pivotally mounting the extension lever on the brake lever in cooperative relation with the brake-release grip, said hanger comprising a U-shaped element having the bow of the U shaped to engage the front face of the brake lever; and means mounted on the engaging face of the hanger for clamping the same to the brake lever.

4. An extension for vehicle brake levers having a handle and a brake-release grip thereon comprising an extension lever; a hanger for pivotally mounting the extension lever on the brake lever in cooperative relation with the brake-release grip, said hanger comprising a U-shaped element having the bow of the U shaped to engage the front face of the brake lever; and means mounted on the engaging face of the hanger for clamping the same to the brake lever, said means comprising pivotally mounted clamping elements adapted to hold the extension in its operative position.

5. An extension for vehicle brake levers having a handle and a brake-release grip thereon comprising an extension lever having a grip engaging element rigidly formed therewith; a hanger for pivotally mounting the extension lever on the brake lever with the grip engaging element in cooperative relation with the brake-release grip, said hanger including a brake lever engaging face having a part shaped to engage the front face of the brake lever; means carried by the brake lever engaging face of the hanger for clamping the same to a brake lever; and means associated with said extension lever for holding the grip engaging element in firm contact with the brake release grip.

6. An extension for a vehicle brake lever having a handle and a brake-release grip thereon comprising an extension lever; a hanger for pivotally mounting the extension lever on the brake lever in cooperative relation with the brake-release grip, said hanger including a resilient element having a brake lever engaging section provided with a depression of greater radius than that of the brake lever and adapted to contact the front face of a brake lever, the resilient element also having a slot positioned adjacent each side of the depression; and means positioned in the slot and adapted to extend around the handle to clamp the hanger thereto, said means drawing the lever engaging portion into close contacting relation to the front of the handle to hold the same thereto.

7. An extension for vehicle brake levers having a handle and a brake-release grip thereon comprising an extension lever; a hanger for pivotally mounting the extension lever on the brake lever in cooperative relation with the brake-release grip, said hanger comprising a U-shaped element; the bow of the U being shaped to engage the front face of the brake lever and the legs of the U extending forwardly of the brake lever; a pivot for the extension lever carried by said forwardly-extending legs; and means mounted on the engaging face of the hanger for clamping the same to the brake lever.

8. An extension for vehicle brake levers having a handle and a brake-release grip thereon comprising an extension lever; a hanger for pivotally mounting the extension lever on the brake lever in cooperative relation with the brake-release grip, said hanger including brake lever engaging sections adapted to engage the sides of the brake lever; projections on the engaging faces of the hanger for preventing the same from slipping on the brake lever; and means for clamping the hanger to the brake lever.

9. An extension for a vehicle brake lever having a handle and a brake-release grip thereon comprising an extension lever; a hanger for pivotally mounting the extension lever on the brake lever in cooperative relation with the brake-release grip, said hanger including a brake lever engaging section having a roughened engaging face; and means for clamping the hanger to the brake lever.

10. An extension for vehicle brake levers having a handle and a brake-release grip thereon comprising an extension lever; a hanger for pivotally mounting the extension lever on the brake lever in cooperative relation with the brake-release grip, said hanger including brake lever engaging sections having roughened projections thereon; and means for clamping the hanger to the brake lever so that the roughened projections bite into the material of the brake lever.

11. An extension handle comprising an extension lever having a manually engageable element thereon; a hanger for mounting the extension lever including a plurality of clamping elements, the contacting faces of the clamping elements being provided with roughened surfaces to prevent slippage when in clamping relation; and means for moving the clamping elements into clamping relation.

GUSTAVE F. BAHR.